(12) United States Patent
Claeyssen et al.

(10) Patent No.: US 8,004,153 B2
(45) Date of Patent: Aug. 23, 2011

(54) FINE POSITIONING SYSTEM USING AN INERTIAL MOTOR BASED ON A MECHANICAL AMPLIFIER

(75) Inventors: Frank Claeyssen, Meylan (FR); Francois Barillot, Le Versoud (FR)

(73) Assignee: Cedrat Technologies, Meylan (FR)

( * ) Notice: Subject to any disclaimer, the term of this patent is extended or adjusted under 35 U.S.C. 154(b) by 162 days.

(21) Appl. No.: 12/450,119

(22) PCT Filed: Mar. 12, 2008

(86) PCT No.: PCT/FR2008/000323
§ 371 (c)(1),
(2), (4) Date: Sep. 11, 2009

(87) PCT Pub. No.: WO2008/132337
PCT Pub. Date: Nov. 6, 2008

(65) Prior Publication Data
US 2010/0038995 A1 Feb. 18, 2010

(30) Foreign Application Priority Data
Mar. 14, 2007 (FR) .................................. 07 01822

(51) Int. Cl.
*H02N 2/00* (2006.01)
*H01L 41/09* (2006.01)
(52) U.S. Cl. ..................... 310/328; 310/317; 310/329
(58) Field of Classification Search ................. 310/317, 310/328, 329
See application file for complete search history.

(56) References Cited

U.S. PATENT DOCUMENTS

| | | | |
|---|---|---|---|
| 4,894,579 A | 1/1990 | Higuchi et al. | |
| 5,225,941 A | 7/1993 | Saito et al. | |
| 5,394,049 A * | 2/1995 | Luecke | 310/328 |
| 5,410,206 A * | 4/1995 | Luecke et al. | 310/328 |
| 6,927,528 B2 | 8/2005 | Barillot et al. | |
| 7,405,508 B2 * | 7/2008 | Petrenko | 310/317 |
| 2002/0033322 A1 | 3/2002 | Nakano et al. | |
| 2005/0258712 A1 | 11/2005 | Hata et al. | |

FOREIGN PATENT DOCUMENTS

| | | |
|---|---|---|
| DE | 196 43 180 A1 | 4/1997 |
| EP | 0 292 989 B1 | 12/1993 |
| EP | 0 720 245 A2 | 7/1996 |
| EP | 0 464 764 B1 | 5/1997 |
| FR | 2 740 276 A1 | 4/1997 |
| FR | 2 850 218 A1 | 7/2004 |
| GB | 2 369 489 A | 5/2002 |

* cited by examiner

Primary Examiner — Thomas M Dougherty
(74) Attorney, Agent, or Firm — Oliff & Berridge, PLC (57) ABSTRACT

The invention relates to a fine positioning system using an inertial motor based on a mechanical amplifier that comprises a first amplified inertial sub-assembly including a mechanical amplifier, a piezoactive member and a countermass. A second relative drive sub-assembly includes a clamp and a clamped member attached to the first amplified inertial sub-assembly. Asymmetric excitation cycles of the first inertial sub-assembly generate impact forces and movements amplified in a driving direction (z), thus resulting in sliding and adhesion successions of the clamped member in the clamp in order to generate a relative translation movements of the points A and B relative to the point D. The mechanical amplifier increases the step size and reduces the supply inrush currents. Fine and dynamic positioning of the point B relative to the point D can be achieved with augmented strokes using the amplifier.

27 Claims, 6 Drawing Sheets

FINE POSITIONING SYSTEM USING AN INERTIAL MOTOR BASED ON A MECHANICAL AMPLIFIER

BACKGROUND OF THE INVENTION

The invention relates to precise positioning systems comprising:
- a first inertial sub-assembly including at least one piezoactive element and at least one inertia point, and able to produce impact forces and movements at an actuating point in an actuating direction,
- a second relative drive sub-assembly including at least one drive member and one driven member, one of the two members being fixed to the first inertial sub-assembly via the actuating point,
- an electronic circuit for supplying each piezoactive element of the first inertial sub-assembly according to predefined excitation cycles.

STATE OF THE ART

Piezoelectric inertia motors are used in precision linear or rotary micro-motorization applications, for example in optics for focusing functions or in microscopy for micro-positioning of samples.

The concept of the piezoelectric inertial motor is described for example in Patent EP 0292989 by T. Higuchi. A piezoelectric element 11 is placed securely between two mass members M noted 12 and m noted 13, these three elements forming a moving assembly. Mass m is always free. Mass M is in sliding contact with friction with a guide 14 acting as fixed reference. The piezoelectric element is excited according to asymmetric excitation cycles, typically by a variable voltage in the form of a saw-tooth. A fast voltage switching applied to the piezoelectric element applied for a time $t_1$ causes fast deformation thereof and therefore fast movement of the ends thereof, which generates an impact force causing mass M to slide with respect to the guide on account of the inertia of mass m. This phase is called the sliding phase. By switching the voltage slowly to its initial value over a time $t_2$, a slow deformation of the piezoelectric element is produced leading to movement of mass m without movement of mass M, the inertia of mass m no longer playing any role and the friction of the guide on mass M acting as brake performing blocking. This phase is called the adhesion phase. Over an asymmetric excitation cycle, a relative movement of mass M and therefore of the moving assembly is thus obtained with respect to the guide and constitutes an elementary step. By repeating this sliding-adhesion cycle, step-by-step operation is achieved enabling long strokes much greater than an elementary step to be effected.

In order to obtain the required operation, fast movement switching time $t_1$ and slow movement switching time $t_2$ are determinant. The notions of "slow" and "fast" are fixed with respect to the natural period of the sub-system formed by mass m and the stiffness k of the piezoelectric element. This natural period T, the inverse of the resonance frequency $f_r$ of this sub-system, is defined according to the formula $T=1/f_r=2p(m/k)^{1/2}$. With a voltage switching time $t_1$ that is less than the natural period T, the inertia of mass m comes into play and the sub-system formed by mass m and stiffness k operates as an impact force generator applied to M and able to accelerate and drive the latter. This criterion fixes the choice of time $t_1 < T$. With a voltage switching time $t_2$ that is much longer than the natural period T, the inertia of mass m no longer plays a role and the sub-system formed by mass m and stiffness k operates as a movement generator only moving m. This criterion fixes the choice of time $t_2 > T$.

With the proposed structures and on account of the great stiffnesses of the piezo elements, the resonance frequencies $f_r$ are high and are in practice located above 10 kHz. The period is then greater than T=100 µs, and $t_1$ therefore has to be smaller than 100 µs. In the case of Patent EP 0292989, the values used are $t_1$=50 µs and $t_2$=2 ms and respect the criterion $t_1 < T < t_2$.

A very similar concept is presented in Patent EP 0464764 A1 by Saito Schuichiro. The parts numbered 17, 12 and 13 of this patent respectively correspond in Patent EP 0292989 to mass M i.e. member 12, piezoelectric element 11, and mass m i.e. member 13. They form a sub-assembly in relative movement with respect to member 1, in frictional sliding contact with 17, as 12 is with respect to 14 in EP 0292989. The difference lies in the fact that sub-assembly 17, 12 and 13 is assumed to be fixed and that member 1 becomes the moving member.

This type of mechanism also provides a fine positioning mode that can be combined with long-stroke positioning mode. For example, in the case of Patent EP 0292989 by Higuchi, fine positioning mode is possible by fixing the load to be driven on mass m. A quasi-static deformation of the piezoelectric element achieved by maintaining the electrical voltage enables the load fixed on mass m to be positioned with a good resolution. The maximum stroke $U_{max}$ is determined by the maximum permissible deformation $S_{max}$ and by the length of piezoelectric element L by the relation $U_{max}=L.S_{max}$. With a typical length of piezoelectric ceramic L=10 mm and a deformation $S_{max}$=0.1%, the maximum stroke is typically $U_{max}$=10 µm.

These mechanisms present several shortcomings:

The currents required to supply the piezoelectric element in fast deformation are high in particular due to the very short switching times necessary to make use of the inertia effect and produce the impact force. Patent EP 0292989 gives typical operating conditions—a switching time $t_1$=50 µs to make the voltage vary by V=150V on a capacitance C=5 µF. This results in an electric current of intensity $I=C.V/t_1$=15 A. This high current, due to the short switching time $t_1$ necessary for fast deformations, solicits the electronics and causes temperature rises in the solders and the electrodes of the piezoelectric elements. It is a source of malfunctioning for the system.

From the mechanical structure point of view, the piezoelectric element has to be rigidly held in contact with the mass elements m and M. A piezoelectric element naturally presents a flat interface without threading which, without any additional mechanism, only enables sticking between the elements. Such sticking is subject to ageing leading in the longer term to a loss of coherence between the piezoelectric element and the mass elements m and M. On account of these stickings, this mechanical structure comprises sources of malfunctions.

The piezoelectric element is implemented without any mechanical pre-stressing. To prevent excessive mechanical tension stresses generating breaking by delamination, the deformation amplitudes of the piezoelectric element have to be limited. This leads to the size of the steps and incidentally the speed being limited and therefore to the performances of the motor being reduced, or in the opposite case in the lifetime of the mechanism being reduced.

From the operating point of view, exciting the motor with deformations that are abrupt and slow also has the consequence of exciting structure modes and of inducing vibrations. These vibrations disturb the precise positioning functions of the motor and can also be sources of malfunctions or of disturbances limiting the speeds if they are not controlled.

Finally, the fine positioning stroke is limited to around ten microns except if piezoelectric elements of great lengths are considered, which leads to non-realistic structures in terms of size. Such a stroke size does not enable stroke requirements of a large order of magnitude to be met.

The document FR 2850218 describes an amplified piezoactive actuator securely fixed to a driven member. It does not describe a clamp and clamped member to allow sliding and adhesion of a driven member. It does not constitute an inertial motor. In the case of FIG. 10, the driven member formed by the mirror-holder is rigidly secured to the inertial sub-assembly by screws which do not allow any sliding-adhesion movement. In the case of FIG. 15, the driven member formed by structure 46, is rigidly secured to the inertial sub-assembly by connecting link 28, which does not allow a sliding-adhesion movement.

The document EP 720245 discloses a piezoelectric motor of the two-legged walker type. According to FIGS. 3 and 5, each leg is composed of a piezo ceramic element (30, 30') and a converter (26, 26') converting translation movement of the piezo ceramic element into a small rotational movement. Operation of the motor is based on an excitation sequence of the two piezos requiring dephasing between the commands of the two piezo ceramic elements. No impact forces are produced for its operation. The ceramic 30, 30' does not comprise any pre-stressing means, as would be recommendable to take advantage of the dynamic effects and to produce impact forces under reliable conditions. It therefore does not relate to an inertial motor based on impact forces.

The documents US 2005/0258712 and US 2002/0033322 describe inertial piezo motors using impact forces of the type mentioned in the above-mentioned Patent application EP0292989. These motors make use of forces produced by a piezo element to make a driven member slide in a clamp. The greater the forces produced by the piezo element, the more easily sliding will be obtained and the better the performances will be. For this reason, amplification of movement of the piezo element in an inertial piezo motor is not suggested in these patents, as on principle, movement amplification is accompanied by a de-amplification of the forces of the piezo element. This results in a movement amplification that at first sight does not provide global gains in dynamic mechanical performances (force, speed of the motor). The gains provided by movement amplification are therefore not situated primarily on the dynamic mechanical performances.

OBJECT OF THE INVENTION

The object of the invention is to remedy these shortcomings and, more particularly, to improve the performances and dependability of piezoactive inertial motors.

According to the invention, the first inertial sub-assembly comprises a mechanical amplifier amplifying the movements of the piezoactive element, the actuating point being situated on the mechanical amplifier, without coming into direct engagement with the piezoactive element. The drive member and the driven member are in the form of at least one clamp and one clamped element to allow a sliding-adhesion movement.

Such a structure enables the fast switching time to be lengthened so as to notably reduce the electrical in-rush current intensities and to increase the fine positioning strokes, and to reduce the countermass weight.

According to a development of the invention, the mechanical amplifier performs mechanical connection between the masses m and M by means of rigid connecting links and mechanical securing of the piezoelectric element.

According to another development of the invention, the mechanical amplifier integrates damping elements in order to reduce the vibration amplitudes caused by excitation of the motor or by external sources and to increase the speed of the motor.

According to another development of the invention, the mechanical amplifier performs pre-stressing of the piezoelectric element.

According to a particular embodiment, the sub-assembly formed by the piezoelectric element and the mechanical amplifier is used to achieve linear motors.

According to another particular embodiment, the sub-assembly formed by the piezoelectric element and the mechanical amplifier is used to achieve rotary motors.

According to a development of the invention, the electronic circuit of the motor enables large-stroke positioning, fine positioning and dynamic positioning modes.

According to a particular embodiment enabling higher speeds to be achieved in large-stroke positioning mode, the electronic circuit performs synchronization between fast switching of the excitation cycle and a maximum of residual vibration of the inertial sub-assembly.

BRIEF DESCRIPTION OF THE DRAWINGS

Other advantages and features will become more clearly apparent from the following description of particular embodiments of the invention, given as non-restrictive examples only and illustrated in the accompanying drawings, in which.

DESCRIPTION OF PARTICULAR EMBODIMENTS

Figure 1:
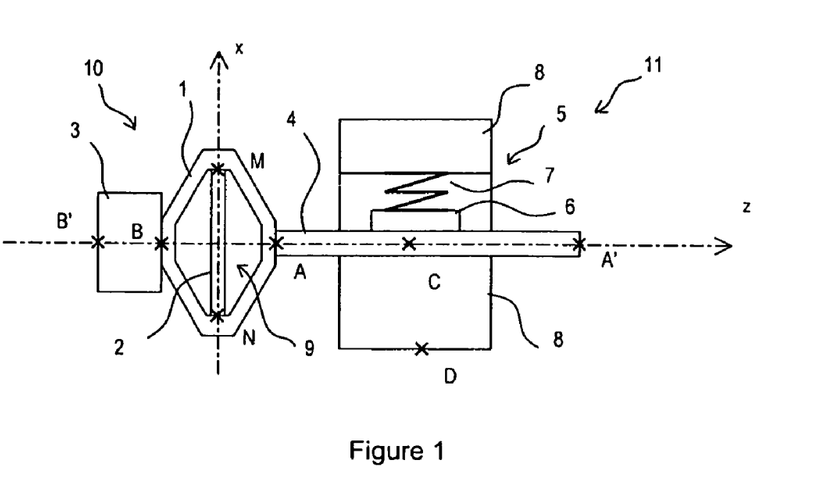
FIG. 1 presents a diagram of a linear inertial motor comprising a mechanical amplifier.

With reference to FIG. 1, the inertial motor comprises a first inertial sub-assembly 10 formed by a mechanical amplifier 1, a piezoactive element 2 and a countermass 3, and a second relative drive sub-assembly 11 comprising in particular a clamp 5 and a clamped member in the form of a shaft 4 oriented along the z-axis. Clamp 5 is formed by a pad 6 in sliding contact with shaft 4 towards point C and by a flexible preloading system 7 secured to the frame 8. System 7 is designed to produce a static force F perpendicular to the z-axis. If point D is fixed, the load to be driven in relative movement can be fixed either towards point A or in its extension A' onto shaft 4 or towards point B or onto countermass towards B'. If point B is fixed, the load to be driven can be fixed towards point D.

Clamp 5 and clamped member 4 can be replaced by any other type of drive member and driven member.

Mechanical amplifier 1 presents an actuating point A and an inertia point B. Mechanical amplifier 1 is based on a shell structure containing piezoactive element 2. This shell structure for example presents substantially the shape of a rhomb. The dimension dx of the amplifier along the x-axis between points M and N is smaller than its dimension dz between points A and B in the direction z. An extension of piezoactive element 2 elongating in the x direction deforms amplifier 1 which causes a contraction of amplifier 1 along the x-axis. On account of the geometry of the amplifier and of the ratio dx/dz>1, the contraction along z is amplified by an amplification ratio a that is close to dx/dz. This type of amplification mechanism is described in Patent FR 2740276. The amplification ratios can vary from 1 to 100 by the design of the amplifier, but they will be typically situated between 3 and 20. The shape of the shell of amplifier 1 can be different, for example in the shape of an ellipsis, a basket-handle or a dog-bone, and may or not present joints that are elastic in flexion. These varied shapes enable the overall size and the performances of amplifier 1 to be made to vary to suit requirements.

Mechanical amplifier 1 is produced by means of a metallic material such as steel, a plastic material or a composite material, for example carbon fibre-based. By assembly and due to its elasticity, mechanical amplifier 1 described in Patent FR 2740276 enables pre-stressing to be applied on piezoactive elements 2, which secures each piezoactive element and prevents the latter from entering into mechanical tension. It provides mechanical interfaces at points A and B such as holes enabling a good mechanical connection with countermass 3 and shaft 4.

Point A and direction z are respectively the actuating point and the actuating direction of inertial sub-assembly 10.

Countermass 3 is a rigid body fixed to inertia point B of amplifier 1.

Another embodiment of the amplified inertial sub-assembly consists in producing amplifier 1, countermass 3 and shaft 4 in a single monolithic part, which reduces manufacturing costs and eliminates problems of connection between these parts.

Piezoactive element 2 is typically a stack of piezoelectric ceramic that deforms longitudinally along the x-axis. The maximum deformation with multilayer piezoelectric ceramics is about $S_{max}=0.1\%$. With a length of ceramic L=10 mm, the maximum extension of the ceramic is 10 μm. The same effect could be obtained with one or more bulk piezoelectric ceramics, electrostrictive ceramics, electroactive ceramics or a bar of magnetostrictive or magnetic shape memory alloy, implementation whereof is completed by a supply coil and a magnetic circuit. Piezoactive element 2 can be completed by a play take-up mechanism such as ramped shims, as described in Patent FR 2740276. This mechanism placed along the x-axis enables any play between piezoactive element 2 and amplifier 1 to be taken up, and makes for ease of adjustment of the pre-stressing produced by mechanical amplifier 1 on piezoactive element 2.

Amplifier 1, piezoactive element 2, countermass 3 and any damping materials placed on the surface of the amplifier or in the complementary 9 form inertial sub-assembly 10.

Clamp 5 of second relative drive sub-assembly 11 is achieved in FIG. 1 by a pad 6 and a flexible preloading system 7. This enables any wear play of pad 6 due to friction between pad 6 and shaft 4 forming the clamped member to be taken up. To limit differentiated expansion problems, the material of shaft 4 should be chosen of the same nature as that of clamp 5, for example of steel. To improve the performances of the motor, it is preferable to treat the interfaces of the contact areas situated at the interface of pad 6 and shaft 4 or to deposit layers of material on these areas, providing a suitable friction coefficient and a low wear rate.

When not supplied with power, the motor is blocked in position by the pre-stressing force F applied in the direction perpendicular to the contact area situated around point C by clamp 5 and shaft 4.

In operation, a relative movement of inertial sub-assembly 10 along z, in particular of points A and B with respect to point D, is obtained by sliding-adhesion by means of asymmetric excitation cycles formed by fast and slow deformations of mechanical amplifier 1 due to those of piezoelectric element 2 and to the electric power supply of this element. For example, if D is fixed, a slow contraction of the amplifier causes movement of point B and of countermass 3 whereas point A and shaft 4 are fixed. A fast elongation of amplifier 1 generates an impact force along z and causes movement of point A and of shaft 4 by sliding in clamp 5. After a slow contraction cycle and a fast elongation, a small positive step along z is obtained. Symmetrically, after a cycle formed by a fast contraction and a slow elongation, a small negative step along z is obtained. A large-stroke positioning mode M1 is performed according to FIG. 2 by accumulation of such small steps obtained in this way by sliding-adhesion. Steps of reduced and adjustable size can be achieved by reducing the control voltage. To obtain the required operation, the fast movement switching time $t_1$ and slow movement switching time $t_2$ are determinant. The notions of "slow" and "fast" are fixed with respect to the natural period T of the sub-system formed, in this motor, by the mass m of countermass 3, the stiffness k of piezoelectric element 2 and the amplification ratio a of amplifier 1. This natural period T, which is the inverse of the resonance frequency $f_r$ of this sub-system, is defined according to these three contributions according to the formula $T=1/f_r=2p.a.(m/k)^{1/2}$. Amplification ratio a being greater than 1, it enables the natural period T to be significantly lengthened. This incidentally enables the fast movement switching time $t_1$ to be reduced in the same proportions and enables the current intensities $I=C.V/t_1$ to be reduced. For an identical stiffness k of piezoactive material and an identical mass m, the use of an amplifier for example with a ratio a=10 enables the in-rush current intensity to be reduced by a factor 10. Considering initial values of I=15 A, the use of such an amplifier brings the in-rush current down to a value of 1.5 A, which is much more endurable for the electronic components of the power supply, the solders and the electrodes of the piezoactive elements. This also makes the electronics easier to achieve. It should be noted that the total electric charge $Q=I.t_1$ supplied on each switching is not modified by the amplification. The mechanical amplifier therefore enables the charge to be better distributed in time without reducing the total electric power supplied at each cycle.

Mechanical amplification also enables the weight of the countermass to be substantially reduced, which is advantageous for miniaturization of the mechanism and for reducing its mass. Natural period T can in fact be written: $T=1/f_r=2.p.(a^2.m'/k)^{1/2}=2.p.(M_{eq}/k)^{1/2}$ with $M_{eq}=a^2.m'$. Amplification enables a countermass weight $m'=M_{eq}/a^2$ to be chosen, which would give the same natural period T as that of a system based on a countermass weight $M_{eq}$ but without an amplifier. With a=10, the countermass weight is thereby reduced by a factor 100, with an identical natural period T for a mechanism without an amplifier. On account of this possibility and of the mass of amplifier 1, countermass 3 can be omitted in a simplified embodiment. In this case, the mass of the part of the amplifier situated towards point B acts as countermass in sliding-adhesion operating mode. Intermediate trade-offs are possible enabling the gains on the current and on the countermass weight to be shared.

Fine positioning mode M2 in the direction z is possible in the particular configurations where the load is fixed on countermass 3 towards points B or B' and where frame 8 towards point D is fixed, or again in the case where the load is fixed on frame 8 towards point D and where countermass 3 towards points B or B' is the mechanical mass. These configurations further have the advantage of allowing loads having a mass that is not negligible compared with that to which it is attached. Fine positioning is obtained by a quasi-static deformation of the mechanical amplifier and of the piezoelectric element, without sliding of the shaft in the clamp. The maximum fine positioning stroke $U_{max}$ is determined by the maximum permissible deformation $S_{max}$, by the length of the piezoelectric element L, and the mechanical amplification a according to the relation $U_{max}=a.L.S_{max}$. With L=10 mm, $S_{max}=10.1\%$ and a=10, a fine positioning stroke $U_{max}=100$ μm is obtained. This stroke 10 times greater than without an amplifier becomes sufficiently great to perform optic fine positioning functions.

A dynamic movement mode M3 with large pass-band and reduced stroke in the direction z is also available in these configurations. So long as the dynamic forces associated with the shaft remain lower than the sliding threshold of the clamp, clamp 5 acts as fixing point and the dynamic amplifier deformations are transmitted in the form of movement to the load. This mode can be superposed on fine positioning mode. It enables for example a sample to made to vibrate after it has been positioned. This function is useful for example in certain X-ray diffraction experiments.

In order to reduce the vibrations of the load or of the frame, which is desirable in optic applications where stability in position is important, it is advantageous to make use of a damping material such as an elastomer acting in relation with amplifier 1 or piezoactive element 2, as described in U.S. Pat. No. 6,927,528. A maximum damping effect is obtained when the elastomer fills cavity 9 inside amplifier 1. Such an elastomer filling cavity 9 further protects piezoelectric element 2 for example against humidity or shocks coming from external parts.

Damping of the mode of inertial sub-assembly 10 further enables the speed of the motor to be increased. At each fast switching, vibration mode of inertial sub-assembly 10 of period T is in fact excited producing a residual vibration of dampened sinus type. Damper 12 enables the duration of this residual vibration to be reduced. The time $t_2$ and therefore the duration of the excitation cycles $T_e=t_1+t_2$ can thereby be reduced. The excitation frequency $f_e=1/T_e$ for performing each step is therefore increased, which increases the mean speed of the motor.

Figure 3:
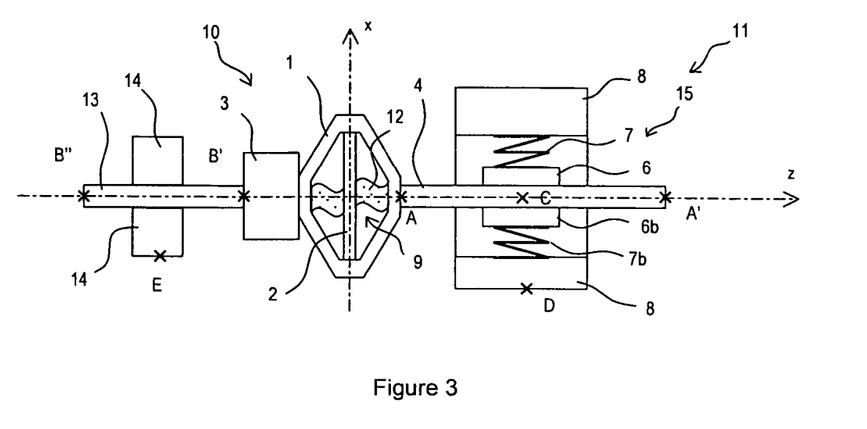
FIG. 3 presents a diagram of a linear inertial motor based on a mechanical amplifier with guiding of the countermass and floating clamp.

FIG. 3 presents a second alternative embodiment of the motor of FIG. 1. Inertial mechanism sub-assembly 10 comprises mechanical amplifier 1, piezoactive element 2, countermass 3 and an elastomer 12 partially filling cavity 9 to provide damping. A guide means is provided at the level of countermass 3. This means can be achieved for example by means of a shaft 13 and a smooth bearing 14. Another embodiment can consist of elastic guiding of mass 3. A floating clamp 15 is implemented to symmetrise the pre-stressing stiffnesses and the pre-stressing forces F exerted perpendicularly to direction z on shaft 4. Floating clamp 15 is achieved for example by means of two pads 6, 6b and two pre-stressing springs 7, 7b. In the same way, floating clamp 15 can be achieved with more than two pads and pre-stressing springs arranged in such a way as to symmetrise the pre-stressing stiffnesses and pre-stressing forces F. In this configuration, point E can be connected to point D to secure guide 14 and frame 8. If these elements form the fixed reference, the load to be driven can be fixed at the level of points A, B' or B". If point B" is the fixed reference, the load can be fixed at D. The advantage of this configuration is that it enables clamp 15 to perform the function of generating friction force F without having to perform all the guiding functions. For example, it may be advantageous to provide shaft 4 in the form of a blade of rectangular cross-section sandwiched in clamp 15 by two pads 6, 6b pressed against shaft 4 by two spring elements 7, 7b as presented in FIG. 4. The pads in this case can have a large contact surface playing on a large height in the third direction. They perform guiding in a similar manner to a flat pressing link. The surfaces of the blade and pads facing one another enable suitable friction layers to be deposited. To complete guiding, shaft 13 can then be a cylindrical shaft linked in the form of a sliding pivot with guide 14. A load fixed at B" would thus be guided in precise manner along z. Operation of this motor is identical to that of FIG. 1. Electrical power supply of piezoelectric element 2 so as to produce fast and slow deformation cycles of mechanical amplifier 1 enables a long stroke to be obtained between inertial sub-assembly 10 and frame 8 by accumulation of steps.

Figure 4:
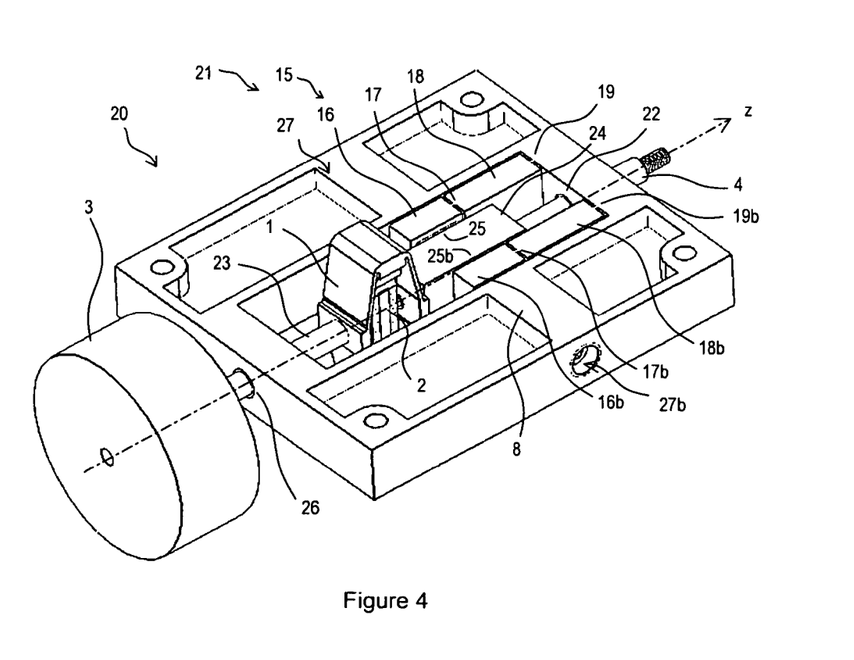
FIG. 4 represents a perspective view of a linear inertial motor based on a mechanical amplifier with guiding of the countermass and floating clamp.

FIG. 4 presents a particular form of an embodiment of the inertial motor with mechanical amplifier according to FIG. 3. Inertial drive mechanism 20 comprises an amplifier 1 containing piezoactive materials 2, and a countermass 3 connected to amplifier 1 by means of shaft 23. Amplifier 1 comes in the form of a shell of substantially elliptical shape presenting external mechanical interfaces on the small axis and internal mechanical interfaces on the large axis. A piezoelectric ceramic and a play take-up mechanism with shims are placed with pre-stressing between these internal mechanical interfaces of amplifier 1. The external mechanical interfaces of amplifier 1 comprise a flat surface and a threaded hole enabling reliable mechanical fixing of shaft 23 and shaft 4. Relative drive sub-assembly 21 is formed by floating clamp 15 and shaft 4 constituting the member clamped by clamp 15. Shaft 4 comprises a part of substantially parallelepipedic shape 24 presenting two contact surfaces on which static forces F of floating clamp 15 of relative drive sub-assembly 21 are exerted. Floating clamp 15 applies forces F via two pads 16 and 16b presenting substantially flat faces which enable friction layers 25 and 25b to be deposited. To produce forces F, the two pads 16 and 16b are pressed by means of springs and adjusting screws housed in holes 17, 17b situated in frame 8 and enable the pre-stressing force to be easily adjusted. Pads 16 and 16b are connected to frame 8 by flexible links. These links are structured in such a way as to be flexible in the direction of force F and stiff in the other directions, in particular in the actuating direction z. These flexible links are for example respectively composed of joints in flexion 17, 17b, of stiff arms 18, 18b, and of joints in flexion 19, 19b. This configuration allows small rotations of the pads which enables forming at the contact interface. To stiffen guiding of the floating clamp pads even more, guiding of the pads in a parallelogram can be reverted to by doubling the arms and flexion joints. Shaft 4 is guided by a bearing 22, and shaft 23 is guided by another bearing 26. Frame 8 is connected to guide bearings 22 and 26. Operation of this motor is identical to that of FIG. 1.

Figure 5:
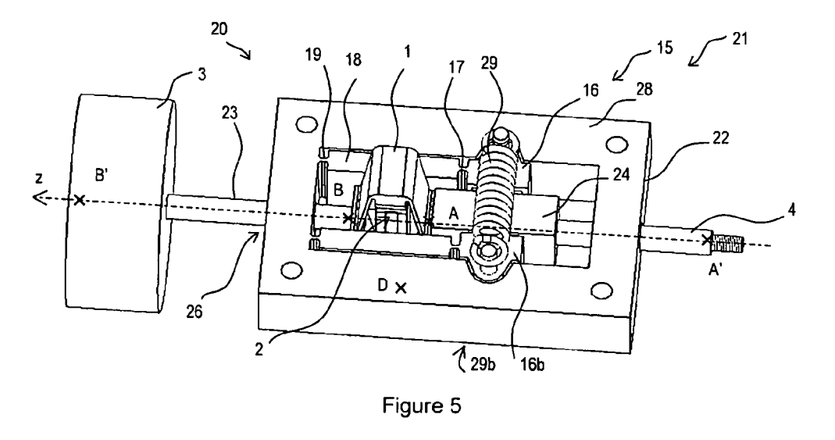
FIG. 5 represents a perspective view of a second linear inertial motor based on a mechanical amplifier with guiding of the countermass and floating clamp.

FIG. 5 presents an alternative embodiment of the inertial motor with mechanical amplifier according to FIG. 4, differing from the latter by relative drive sub-assembly 21. Floating clamp 15 of this sub-assembly applies forces F by means of two pads 16 and 16b pressed against the parallelepipedic area of shaft 4 via two springs 19, 19b directly connecting the two pads. Pads 16 and 16b are connected to frame 28 by flexible links. These links are structured such as to be flexible in the direction of force F and stiff in the other directions, in particular in the actuating direction z. These flexible links are for example respectively composed of joints in flexion 17, 17b, of stiff arms 18, 18b, and of joints in flexion 19, 19b. This configuration has the advantage of naturally balancing the forces applied on the two pads and of eliminating the forces transmitted to the guide bearings 22 and 26.

Figure 6:
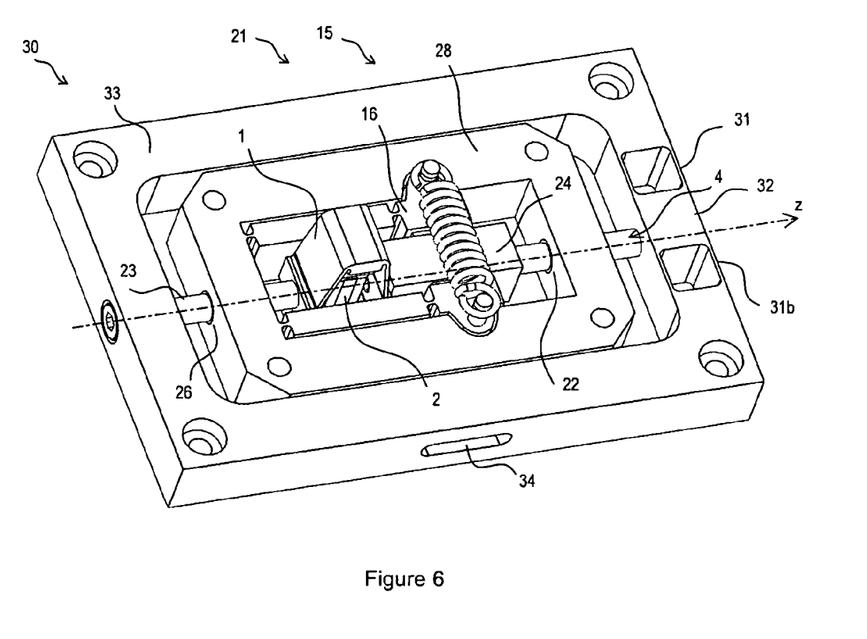
FIG. 6 presents a perspective view of a linear inertial plate based on a mechanical amplifier.

FIG. 6 presents an alternative embodiment of the inertial motor with mechanical amplifier according to FIG. 5, leading to a linear plate. Inertial drive mechanism 30 implements an amplifier 1 containing a piezoelectric element 2 and connected by a shaft 23 to a countermass 33 presenting the shape of a rectangular ring comprising interface holes. Countermass 33 is also connected to shaft 4 by area 32 via guide means 31, 31b. Guide means 31, 31b are achieved by flexion blades performing guiding of area 32 according to a parallelogram, flexible in the direction z and stiff perpendicularly. This flexibility allows deformations of amplifier 1 in the direction of the z-axis which are necessary for operation of inertial mechanism 30. This configuration enables the weight of countermass 33 to be taken up and its centre of gravity to be shifted substantially to the centre of the plate. This enables reduction of the torques produced by the effect of vibrations on the countermass, due for example to external vibrations in embedded applications. Relative drive sub-assembly 21 is identical to that of FIG. 5. Frame 28 taking up floating clamp 15 and comprising interface holes can translate along shafts 4 and 23 respectively by means of guide bearings 22 and 26. The annular shape of frame 28 enables its centre of gravity to be placed substantially in the centre of the plate, procuring the advantages mentioned above. To prevent relative rotation of frame 28 with respect to countermass 33 around axis z, a guide pin fixed on frame 28 can slide in the oblong hole 34 allowing a relative movement of frame 28 with respect to countermass 33 along z. In this configuration, the load to be driven and the fixing base of the plate can be fixed via the interface holes respectively onto frame 28 and countermass 33 or vice-versa. Inertial sub-assembly 30 can move relatively to relative drive sub-assemblies 21, as for the motor presented in FIG. 1. All the movements represented in FIG. 2 can be produced.

Figure 7:
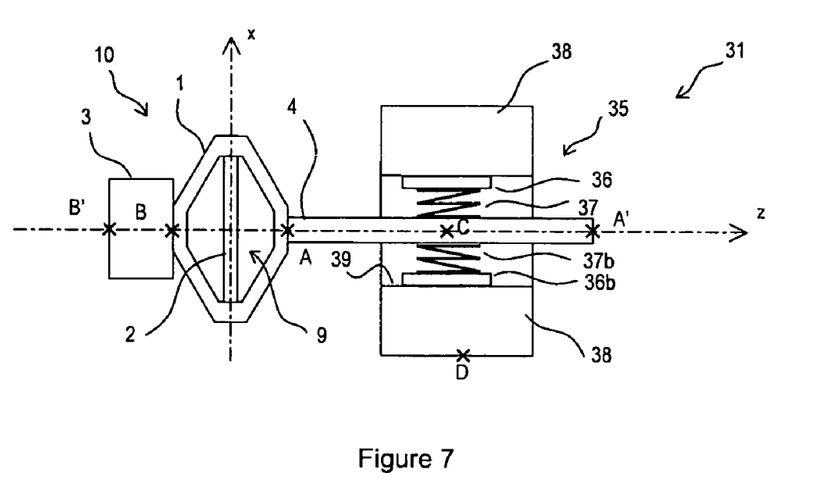
FIG. 7 presents a diagram of a linear inertial motor based on a mechanical amplifier and with a clamp on the shaft.

FIG. 7 presents another alternative embodiment of the motor of FIG. 1 differing from the latter by relative drive sub-assembly 31. Clamp 35 formed by pre-stressing spring 37 and pad 36 is fixed onto shaft 4. Frame 38 is the member clamped by clamp 35 acting on internal surface 39. It can slide in relative translation with respect to pads 36, 36b and to shaft 4 when sliding-adhesion mode is implemented by means of amplified inertial sub-assembly 10. More detailed embodiments can be deduced from the layout of this diagram and from the previous figures. In particular clamp 35 can be achieved with joints or in symmetrised form, like the clamps 35 of FIGS. 4 to 6.

The different motors and linear mechanisms described above can be used to perform precise positioning functions with blocking in position for different applications in the fields of instrumentation, optics, precision mechanics, manufacturing machines, electrical distribution such as switches or contactors, and fluidics such as solenoid valves. Depending on requirements, they are controlled in open loop or in closed loop. In this case a position sensor is implemented to measure the stroke between the load and the mechanical mass.

Figure 8:
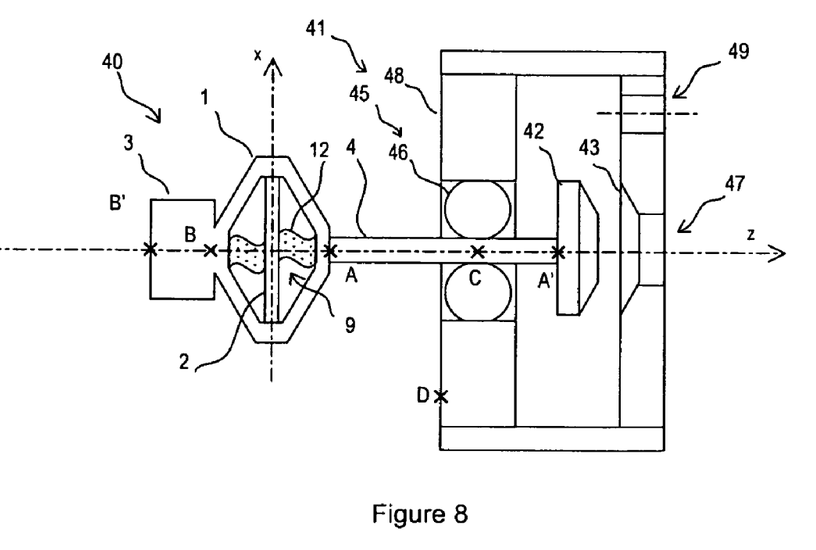
FIG. 8 presents a diagram of a linear solenoid valve with a linear inertial motor based on a mechanical amplifier.

An integrated application of the linear solenoid valve type is presented in FIG. 8. Amplified inertial sub-assembly 40 is similar to sub-system 10 of FIG. 1. End A' of shaft 4 is completed by an interface 42 of valve type adapted to suit valve seat 43. Relative drive sub-assembly 41 is formed by a frame 48 forming the valve body and a sealed clamp 45 performing both the function of clamp of shaft 4 and tight sealing of the valve. The valve body comprises two channels 47 and 49 for circulation of a fluid between the inside and outside of the valve body. In a very simplified embodiment, tightly sealed clamp 45 is formed by an O-ring seal 46 the idle internal diameter of which is smaller than that of shaft 4. By inserting shaft 4 in the hole left by seal 46, the latter is compressed and exerts a radial pre-stressing force F thereby performing the clamping function necessary for sliding-adhesion mode operation. Seal 46 thus performs a first rough function of guiding shaft 4 in translation along z. If necessary, to improve guiding, a second guiding can be added on the countermass side as in FIG. 3. When inertial sub-assembly 40 is powered according to long-stroke mode, the valve can either be closed or be more or less open, thereby enabling a proportional solenoid valve to be achieved. This application illustrates in a more general manner the possibility according to this method of achieving a shaft in translation passing through a wall while at the same time preserving the tightness. This function can be useful for example for handling samples in a sterile medical enclosure.

Rotary motors with one or two degrees of freedom can be produced from an amplified inertial sub-assembly and a relative drive sub-assembly performing guiding in rotation.

Figure 9:
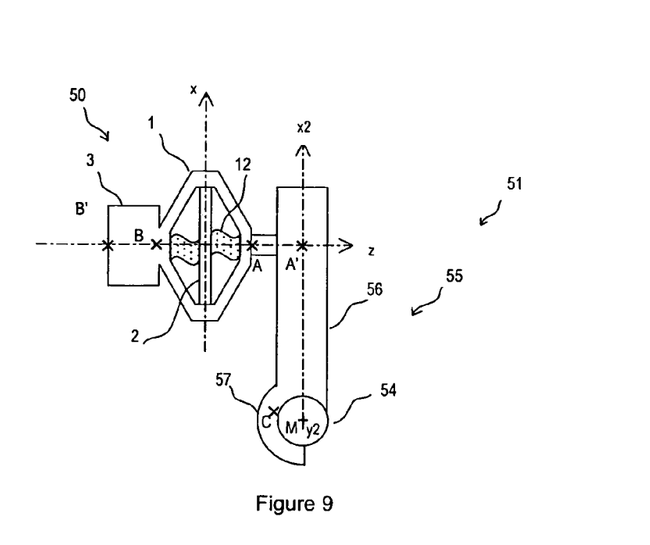
FIG. 9 presents a diagram of a linear inertial motor based on a mechanical amplifier.

FIG. 9 presents a first rotary motor based on an inertial sub-assembly 50 acting in the direction z, similar to sub-system 10 of FIG. 1, and on a relative drive sub-assembly 51. Inertial sub-assembly 50 is connected to relative drive sub-assembly 51 by an arm 56 fixed to clamp 55. Clamp 55 provides the flexible pre-stressing force F on a rotation shaft 54 forming clamped member, oriented along an axis y2 passing through M, perpendicular to the plane of FIG. 9. In the case of FIG. 9, clamp 55 is formed by a jointed part 57 partially wound around shaft 54, on a contact area situated around point C. Jointed part 57 presents a slightly smaller idle internal diameter than the diameter of shaft 54 and presents a radial flexibility. When the shaft is inserted in jointed part 57, the latter deforms thereby generating the radial pre-stressing force giving rise to a holding torque. Jointed part 57 further performs guiding of amplified inertial sub-assembly 50 in rotation with respect to shaft 54. By asymmetric excitation cycles of piezoelectric element 2, inertial sub-assembly 50 exerts impact forces along z towards the point A' which produce forces tangential to the contact area resulting in torques around shaft 54. These tangential forces are not necessarily parallel to the forces produced by the inertial sub-assembly. Due to clamp 55 and to the sliding-adhesion mode, amplified inertial sub-assembly 50 and in particular point B' can move in rotation around axis y2 over a large angular stroke or even over an unlimited number of revolutions. The fine angular and dynamic positioning modes of point B' with respect to point M are possible as presented in FIG. 2.

The concept presented in FIG. 9 also enables a spherical-drive motor to be achieved. In this case, part 54 is a part presenting a spherical surface in its contact areas with jointed area 56 of clamp 55. A second amplified inertial sub-assembly of identical structure to sub-assembly 50 is fixed towards point A' and acts in a direction z' orthogonal to the plane formed by the axes x2 and z. This structure enables two active degrees of freedom in rotation around point M to be produced, in the centre of part 54. To obtain a spherical-drive motor with three degrees of freedom in rotation, three or more amplified inertial sub-assemblies simply have to be implemented on arm 56 in directions situated in the same plane perpendicular to the axis x2 passing through A' but not concurrent with point A'.

Figure 10:
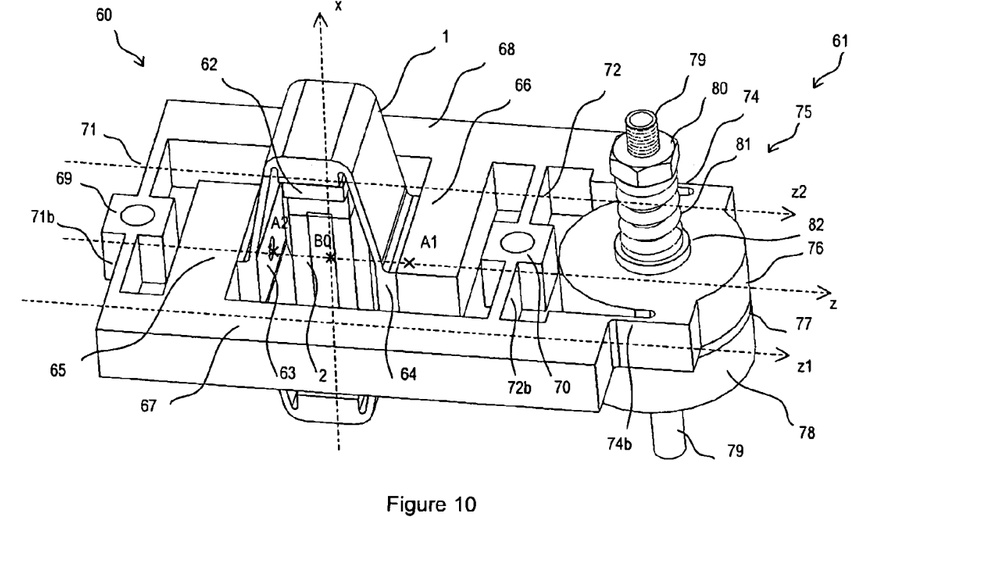
FIG. 10 presents a perspective view of a rotary inertial motor based on a mechanical amplifier.

FIG. 10 presents a particular embodiment of a rotary motor based on an inertial sub-assembly 60 acting in the direction z and a relative drive sub-assembly 61.

Inertial sub-assembly 60 comprises a mechanical amplifier 1 comprising a piezoelectric element 2 acting along the x-axis and kept pre-stressed inside the amplifier by means of play take-up shims 62. Interfaces 63, 64 of amplifier 1 are respectively fixed at the level of its actuating points A1 and A2 to arms 65, 66, themselves fixed to arms 67, 68. Arms 67, 68 are connected to the motor fixing interfaces 69, 70 by means of elastic links 71, 71b, 72, 72b flexible in the direction z.

Relative drive sub-assembly 61 comprises clamp 75 fixed onto rotary shaft 79 and a stator disk 76 forming the clamped member. Clamp 75 comprises a rotor 78 coated with a friction coating 77 and securely fixed to shaft 79. Shaft 79 passes through disk 76 and enables a preloading force F to be exerted between rotor 78 and stator disk 76 via a nut 80, a spring 81 and a bearing 82. Nut 80 enables the preloading to be adjusted. Bearing 82 enables clamp 75 to rotate with respect to stator disk 76. Stator disk 76 is attached to arms 67 and 68 of inertial sub-assembly 60 by links 74 and 74b which are stiff in the directions z1 and z2 and flexible in the other directions.

When powered off, the preloading force F keeps rotor 78 blocked. By asymmetric excitation cycles of piezoelectric element 2, inertial sub-assembly 60 exerts dynamic forces in the direction z. The forces and movements produced by the amplifier at A1 and A2 are exerted in opposite directions. For reasons of symmetry, point B0 is fixed and acts as countermass. The opposing movements of amplifier 1 produced at A1 and A2 are transmitted via arms 65, 66, 67, 68 to links 74 and 74b. These links are driven in movement along the axes z1 and z2 in opposite directions, which produces a torque around shaft 79. Fine angular and dynamic positioning modes of shaft 79 are also possible as presented in FIG. 2.

Figure 11:
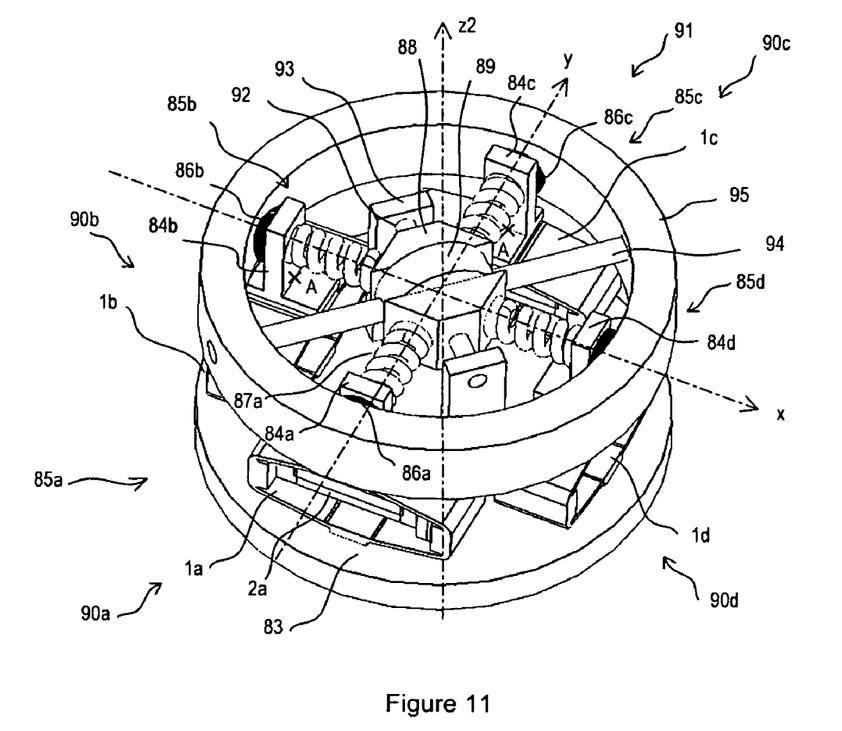
FIG. 11 presents a perspective view of a spherical-drive inertial motor based on 4 mechanical amplifiers.

FIG. 11 presents a particular embodiment of a spherical-drive rotary motor based on four identical inertial sub-assemblies 90a, 90b, 90c, 90d, and a relative drive sub-assembly 91. Sub-assembly 90a for example comprises a mechanical amplifier 1a and a ceramic 2a. It is fixed to base 83, acting as countermass. Sub-assembly 90a acts on relative drive sub-assembly 91 via lug 84a. The other three inertial sub-assemblies 90b, 90c and 90d present the same structures as sub-assembly 90a but are simply arranged at 90° around the axis z passing through the centre of the mechanism. Relative drive sub-assembly 91 comprises identical clamps 85a, 85b, 85c and 85d acting via the inside on cup 95 forming the clamped member. Cup 95 is represented in the form of a ring to make FIG. 11 easier to understand, but should preferably be in the form of a cup of spherical internal surface. The load to be driven is fixed on its external surface. Clamp 85a is formed by a spring 87a and lug 84a whereon a friction pad 86a is fixed in contact with cup 95. Clamps 85a, 85b, 85c, 85d are connected to base 83 by means of a support 88 and a universal joint link. This support part 88 is pass-through to enable rotating shaft 92 to pass through guided by bearing 93. Shaft 92 is fixed to hub 89 which is securedly affixed to shaft 94 attached to cup 95. Hub 89 is guided in rotation by support 88. Parts 88, 89, 92, 93, 94 form a universal joint that performs guiding of cup 95 in rotation around the x and y axes perpendicular to the axis z2. In this structure, the inertial sub-assemblies are used in push-pull manner. For example to bring about a rotation step of cup 95 around the x-axis, amplified inertial sub-assemblies 90a and 90c are excited so as to produce movements respectively of lugs 84a and 84c of opposite directions and to make use of the sliding-adhesion mode of clamps 85a and 85c. In the same way, sub-assemblies 90b and 90d enable a rotary step of cup 95 to be made around the y-axis. These rotations can be combined to produce large rotational strokes. The fine angular and dynamic positioning modes of cup 95 with respect to base 83 are possible as presented in FIG. 2.

Figure 12:
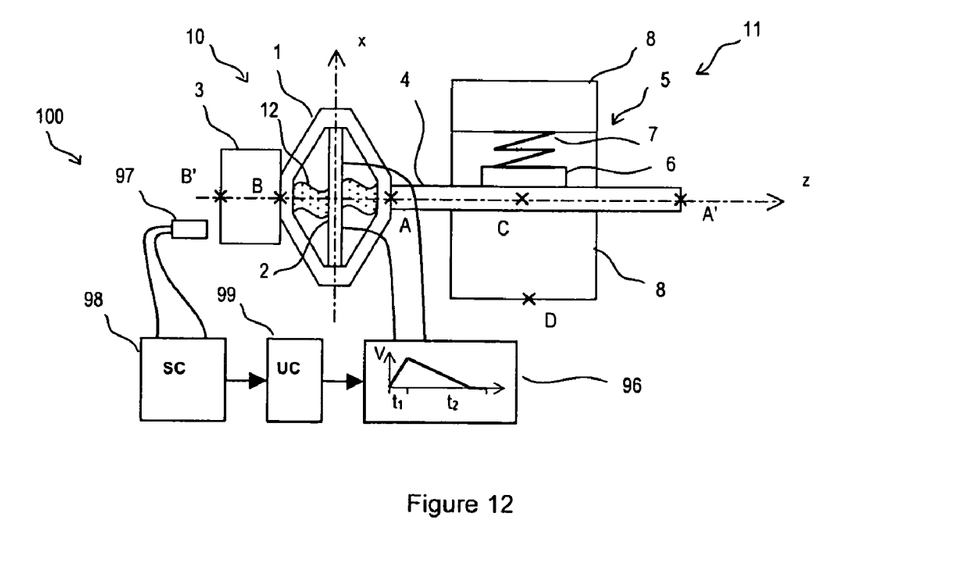
FIG. 12 presents a diagram of a power supply and control system for an inertial motor based on a mechanical amplifier.

FIG. 12 represents a system comprising a drive mechanism based on an amplified inertial sub-assembly 10 and a relative drive sub-assembly 11 plus an electronic circuit 100 including an electric power supply 96, a position sensor 97, sensor conditioning electronics 98 and control electronics 99. The use of an electronic circuit 100 is presented for the case of FIG. 1 but is also just as applicable to both the linear and rotary motors presented in FIGS. 3 to 11.

Figure 2:
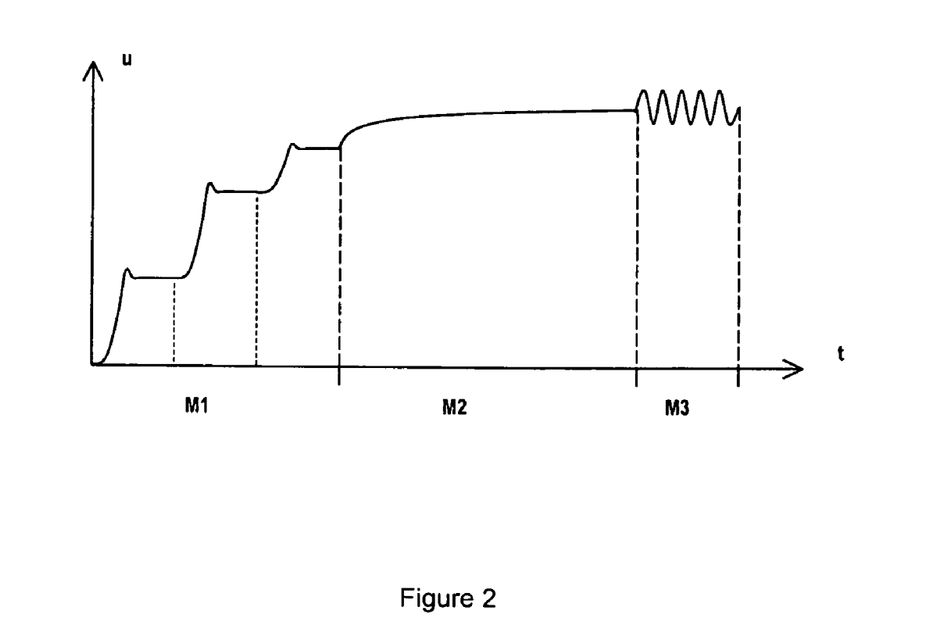
FIG. 2 presents the time diagram of the stroke of the load obtained according to the 3 possible modes: M1: Large-stroke mode, by accumulation of variable-size steps; M2: Fine positioning mode, by quasi-static deformation; M3 Dynamic positioning mode, by dynamic deformation.

Electronic circuit 100 is designed to supply power to each piezoactive element of amplified inertial sub-assembly 10. In a more complex embodiment, it further enables the relative movements between two chosen points of the system to be controlled. Electric power supply 96 enables the voltages and currents necessary for piezoactive element 2 placed in amplifier 1 of first sub-assembly 10 to be generated. It in particular enables asymmetric excitation cycles of M1 mode to be generated, each period of which cycle is formed by a short switching $t_1$ and a long switching $t_2$ in order to produce an alternation of fast and slow deformations of mechanical amplifier 1. Position sensor 97 can be a contact-less sensor for example of inductive, capacitive or optic type. In a limited embodiment, sensor 97 can be a deformation gauge. The signals from sensor 97 are conditioned by conditioning electronics 98. Control electronics 99 retrieve the position information from conditioner 98 and the instructions given by the user to command power supply 96. In an interesting particular embodiment when the load is fixed onto countermass 3, position sensor 97 can be a contact-less sensor connected to frame 8 and placed facing countermass 3. In this case, all the modes M1, M2 and M3 of movement presented in FIG. 2 are possible and can be measured by sensor 97. Control electronics 99 can then be used to perform lock-loop control in position of the load fixed to the countermass.

In a particular embodiment of electronic circuit 100, the speed of the motor in mode M1 is increased by synchronization of fast switching of each new excitation cycle with a maximum amplitude of the residual vibration in inertial sub-assembly 10. In this case, the instantaneous speed acquired by inertia point B contributes to sliding of clamp 5 and enables the step amplitude to be maximized. Furthermore, it is not necessary to wait until the end of residual vibration to engage a new excitation cycle. The time $t_2$ and therefore the duration of the excitation cycles $T_e = t_1 + t_2$ can thereby be reduced. The excitation frequency $f_e = 1/T_e$ for performing each step is therefore increased. The increases of step amplitude and excitation frequency achieved by synchronization thereby substantially increase the mean speed of the motor.

Synchronization is all the easier to achieve the greater the period T of residual vibration of inertial sub-assembly 10 by means of the amplification □ due to amplifier 1. It can be achieved by adjusting the excitation frequency $f_e$. It can also be achieved via the control electronics 99 to trigger the fast switching order to power supply 96 by means of measurement of the residual vibration of inertial sub-assembly 10. This measurement can be performed directly by position sensor 97, for example at inertia point B, and conditioner 98. It can also be performed indirectly by analyzing the electric current of piezoactive element 2, this current presenting an image of the residual vibration of inertial sub-assembly 10.

Piezoactive element 2 is preferably a multilayer piezoelectric ceramic with dimensions of 5 mm×5 mm×10 mm offering an idle synchronization stroke of 20 μm under V=150V and a capacitance of C=1.6 μF. The mechanical amplifier presents an amplification ratio close to □=4. Due to this amplification and a countermass of 100 gr, the natural frequency is situated around 0.6 kHz and the natural period T=1.6 ms. The condition to be met for the fast switching time $t_1$, which has to be low compared with period T, is thus easy to achieve, for example by taking $t_1$=200 μs. Under these conditions, on account of the capacitance C and voltage V, a supply current I=1 A when fast switching takes place is sufficient to perform steps of about 15 μm and to obtain a speed varying from 2 mm/s to 10 mm/s if a synchronization is implemented. This relatively weak current I enables low-consumption miniaturized electronic circuits 100 to be achieved at low cost. The amplification ratio close to □=4 further enables a static stroke $U_{max}$=80 μm to be obtained in practice that is high enough to be able to be used to achieve fine positioning mode in a large number of precision applications.

The invention claimed is:

1. A fine positioning system comprising:
a first inertial sub-assembly including at least one piezoactive element and at least one inertia point, and able to produce impact forces and movements at an actuating point in an actuating direction,
a second relative drive sub-assembly including at least one drive member and one driven member, one of the two members being fixed to the first inertial sub-assembly via the actuating point, and
an electronic circuit for supplying each piezoactive element of the first inertial sub-assembly according to pre-defined excitation cycles,
wherein:
the first inertial sub-assembly comprises a mechanical amplifier amplifying the movements of the piezoactive element,
the actuating point is situated on the mechanical amplifier, without coming into direct engagement with the piezoactive element, and
the drive member and the driven member are in the form of at least one clamp and one clamped element to allow a sliding-adhesion movement.

2. The system according to claim 1, wherein the piezoactive element extends orthogonally with respect to the direction of movement of the first inertial sub-assembly, and that the mechanical amplifier is formed by a shell substantially in the shape of a rhomb, the internal large axis whereof contains the pre-stressed piezoactive element, and the active ends whereof are situated on the small axis.

3. The system according to claim 1, wherein the first inertial mechanism sub-assembly comprises a countermass on the side where the inertia point is situated.

4. The system according to claim 3, wherein the mechanical amplifier and the countermass form a monolithic part.

5. The system according to claim 1, wherein the second relative drive sub-assembly comprises a shaft allowing a relative translational movement with respect to the clamp.

6. The system according to claim 5, wherein the inertia point of the mechanical amplifier or its extension is guided in translation.

7. The system according to claim 6, wherein guiding of the inertia point is performed by a shaft sliding in a bearing.

8. The system according to claim 5, wherein the countermass is fixed to the shaft by a link that is flexible along the axis z and rigid in the other directions.

9. The system according to claim 5, wherein the clamp is achieved by at least one pad pressed onto the clamped member by springs pressing on the frame.

10. The system according to claim 5, wherein the clamp comprises two pads pressed onto the clamped member and connected to one another by springs.

11. The system according to claim 5, wherein the clamp is achieved by at least one pad pressed onto the frame by springs fixed to the shaft.

12. The system according to claim 9, wherein the pads are guided by elastic connecting links that are stiff in the direction of the z-axis and by flexible links in the other directions.

13. The system according to claim 5, wherein the clamp is achieved by a pressing flexible seal.

14. The system according to claim 13, wherein the seal further performs a tightness function.

15. The system according to claim 5, wherein the shaft is used for opening and closing a valve.

16. The system according to claim 1, wherein the second relative drive sub-assembly comprises at least one guide means allowing a relative rotational movement either between a drive member and a driven member or between a clamp and a clamped member.

17. The system according to claim 16, wherein the first inertial sub-assembly operates in collaboration with an arm guided by a shaft to achieve a rotary motor.

18. The system according to claim 16, wherein at least inertial sub-assembly acts on an arm guided by a swivel-pin to achieve a spherical-drive motor.

19. The system according to claim 16, wherein the first inertial sub-assembly exerts an opposite actuating force on each of the arms to produce a torque on a hub fixed to the arm by flexible links.

20. The system according to claim 16, wherein a plurality of inertial sub-assemblies exert their actuating forces tangentially to the surface of a part in the shape of a ring or a cup to achieve a spherical-drive motor with two degrees of freedom.

21. The system according to claim 1, wherein the electronic circuit of the piezoactive elements generate asymmetric excitation cycles formed by fast switchings and slow switchings to enable a long-stroke positioning mode.

22. The system according to claim 1, wherein the electronic circuit of the piezoactive elements delivers adjustable DC voltages to enable a fine positioning mode.

23. The system according to claim 1, wherein the electronic circuit of the piezoactive elements produces variable voltages to enable a dynamic positioning mode.

24. The system according to claim 21, wherein the electronic circuit comprises a power supply, a position sensor, a conditioner and a controller enabling lock-loop control in relative position of the load.

25. The system according to claim 1, wherein the mechanical amplifier comprises areas equipped with damping materials.

26. The system according to claim 1, wherein the mechanical power supply comprises fast switching means of the excitation cycle in synchronization with a maximum of residual vibration of the inertial sub-assembly.

27. The system according to claim 26, wherein the electronic circuit comprises means for measuring the residual vibration of the inertial sub-assembly to perform synchronization.

* * * * *